United States Patent
Yun

(10) Patent No.: US 11,321,011 B2
(45) Date of Patent: May 3, 2022

(54) CONTROLLER FOR CONTROLLING COMMAND QUEUE, SYSTEM HAVING THE SAME, AND METHOD OF OPERATING THE SAME

(71) Applicant: SK hynix Inc., Gyeonggi-do (KR)

(72) Inventor: Ho Jung Yun, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 80 days.

(21) Appl. No.: 16/175,382

(22) Filed: Oct. 30, 2018

(65) Prior Publication Data

US 2019/0294369 A1    Sep. 26, 2019

(30) Foreign Application Priority Data

Mar. 20, 2018   (KR) .......... 10-2018-0032238

(51) Int. Cl.
  *G06F 12/00*   (2006.01)
  *G06F 3/06*    (2006.01)

(52) U.S. Cl.
  CPC .......... *G06F 3/0659* (2013.01); *G06F 3/0613* (2013.01); *G06F 3/0658* (2013.01); *G06F 3/0673* (2013.01)

(58) Field of Classification Search
  CPC .... G06F 3/0659; G06F 3/0613; G06F 3/0658; G06F 3/0673; G06F 3/061; G06F 13/16; G06F 3/0679; G06F 13/1668; G06F 3/0652
  USPC ....................................................... 711/154
  See application file for complete search history.

(56) References Cited

U.S. PATENT DOCUMENTS

| | | | | |
|---|---|---|---|---|
| 5,570,332 A * | 10/1996 | Heath | ............ | G06F 3/0601 369/30.1 |
| 6,216,178 B1 * | 4/2001 | Stracovsky | ......... | G06F 12/0215 710/116 |
| 6,553,454 B1 * | 4/2003 | Harada | ............ | G06F 3/0601 710/52 |
| 2004/0184470 A1 * | 9/2004 | Holden | ............ | H04L 49/25 370/412 |
| 2005/0018486 A1 * | 1/2005 | Kawai | ............ | G11C 16/3468 365/185.21 |
| 2008/0034174 A1 * | 2/2008 | Traister | ............ | G06F 12/0246 711/159 |
| 2010/0306417 A1 * | 12/2010 | Stephens | ............ | G06F 13/1631 710/5 |

(Continued)

FOREIGN PATENT DOCUMENTS

| | | |
|---|---|---|
| KR | 101354341 | 1/2014 |
| KR | 101371815 | 3/2014 |
| KR | 101679251 | 11/2016 |

*Primary Examiner* — Mardochee Chery
(74) *Attorney, Agent, or Firm* — IP & T Group LLP

(57) ABSTRACT

A memory controller for controlling an operation of a device may include a command queue, a command queue controller, and a command information storage. The command queue may store a plurality of commands. The command queue controller may control an operation of the command queue using a pop signal and a push signal. The command information storage may store command information corresponding to each of the commands stored in the command queue. The command queue controller may control the command queue by checking the commands stored in the command queue based on the command information and converting the checked commands based on a result of the checking.

22 Claims, 15 Drawing Sheets

(56) References Cited

U.S. PATENT DOCUMENTS

2011/0055456 A1\* 3/2011 Yeh ................... G06F 12/0862
711/103
2017/0262192 A1\* 9/2017 Aga .................... G06F 3/0656
2019/0278514 A1\* 9/2019 Chaturvedi ............ G11C 29/36

\* cited by examiner

CONTROLLER FOR CONTROLLING COMMAND QUEUE, SYSTEM HAVING THE SAME, AND METHOD OF OPERATING THE SAME

CROSS-REFERENCE TO RELATED APPLICATION

The present application claims priority under 35 U.S.C. § 119(a) to Korean patent application number 10-2018-0032238, filed on Mar. 20, 2018, the entire disclosure of which is incorporated herein by reference in its entirety.

BACKGROUND

1. Field of Invention

Various embodiments of the present disclosure generally relate to an electronic device, and more particularly, to a controller, a system including the controller, and a method of operating the controller.

2. Description of Related Art

Generally, a memory device may have a two-dimensional structure in which strings are horizontally arranged on a semiconductor substrate, or a three-dimensional structure in which strings are vertically stacked on a semiconductor substrate. The three-dimensional memory device, which was devised to overcome a limitation in the degree of integration of the two-dimensional memory device, may include a plurality of memory cells which are vertically stacked on a semiconductor substrate.

SUMMARY

Various embodiments of the present disclosure are directed to a controller capable of more efficiently using a command queue, and a system including the controller.

Various embodiments of the present disclosure are directed to a method of operating a controller capable of more efficiently using a command queue.

A controller for controlling an operation of a device in accordance with an embodiment of the present disclosure may include a command queue, a command queue controller, and a command information storage. The command queue may store a plurality of commands. The command queue controller may control an operation of the command queue using a pop signal and a push signal. The command information storage may store command information corresponding to each of the commands stored in the command queue. The command queue controller may control the command queue by checking some of the commands stored in the command queue based on the command information and converting the checked commands based on a result of the checking.

In an embodiment, the command queue controller may apply a pop signal to the command queue to output a command and check the outputted command, and then apply a push signal to the command queue so that the outputted and checked command is inputted to the command queue again. The command queue controller may check the outputted command based on the command information corresponding to the outputted command.

In an embodiment, the command information may include busy time information and address information of the outputted command.

In an embodiment, the command queue controller may include a command checking component and a command converter. The command checking component may check at least some of the commands outputted from the command queue in response to pop signals. The command converter may convert at least one outputted and checked command based on a result of checking the at least some of the outputted commands.

In an embodiment, the command checking component may generate a check table based on command information corresponding to each of the outputted commands, and generate check-result data instructing to perform the conversion of at least one checked command based on the check table. Furthermore, the command converter may control the command queue by converting the at least one checked command based on the check-result data.

In an embodiment, the command converter may generate the check-result data to change a sequence of the plurality of checked commands such that a command having a shortest busy time is outputted first, with reference to the busy time information of the check table.

In an embodiment, the command converter may generate the check-result data such that one of a plurality of checked commands referring to an identical address is erased, with reference to the address information of the check table.

In an embodiment, the command converter may generate the check-result data such that a plurality of checked commands referring to successive physical addresses are combined into one command, with reference to the address information of the check table.

In an embodiment, the command queue controller may further include a command storage configured to store at least one of the checked commands stored in the command queue.

In an embodiment, the command storage may include a temporary storage that temporarily stores at least one of the commands that enables the command converter to convert the at least one command.

In an embodiment, before the command converter converts the at least one command, the command storage may back up the commands stored in the command queue.

A method of operating a controller configured to control an operation of a device in accordance with an embodiment of the present disclosure may include checking commands stored in a command queue and to be transmitted to the device, and converting at least one of the checked commands stored in the command queue based on a result of the checking.

In an embodiment, the checking of the commands may include applying a pop signal to the command queue, checking an outputted command, and applying the outputted command and a push signal to the command queue to reinsert the outputted command into the command queue.

In an embodiment, the method may further include applying, when a command which has not been checked is present in the command queue after the applying of the outputted command and the push signal to the command queue, a pop signal to the command queue, and checking a subsequently outputted command.

In an embodiment, the converting of the at least one of the commands stored in the command queue may include erasing at least one of the checked commands stored in the command queue.

In an embodiment, the erasing of the at least one of the checked commands stored in the command queue may include applying a pop signal to the command queue, and determining whether the checked command, which is outputted again according to the pop signal, is a target command to be erased.

In an embodiment, the method may further include applying, when the checked command, which is outputted again according to the pop signal, is the target command to be erased, a pop signal to the command queue, and outputting a subsequent command among the checked commands from the command queue.

In an embodiment, the method may further include applying, when the checked command, which is outputted again according to the pop signal, is not the target command to be erased, the checked command, which is outputted again according to the pop signal, and a push signal to the command queue.

In an embodiment, the converting of the at least one of the commands stored in the command queue may include changing the turn of at least one of the checked commands stored in the command queue.

In an embodiment, the changing of the turn of the at least one of the checked commands may include applying a pop signal to the command queue, and determining whether the turn of the checked command, which is outputted again according to the pop signal, is transferred to a subsequent turn.

In an embodiment, the method may further include temporarily storing the checked command, which is outputted again according to the pop signal, when the checked command, which is outputted again according to the pop signal, is a command to be transferred to the subsequent turn.

In an embodiment, the method may further include applying the checked command, which is outputted again according to the pop signal, and a push signal to the command queue when the checked command, which is outputted again according to the pop signal, is not a command to be transferred to the subsequent turn.

An interface system device in accordance with an embodiment of the present disclosure may include a controller and an input/output device. The controller may be configured to output commands for controlling an operation of a device. The input/output device may be configured to output a command outputted from the controller to the device. The controller may include a command queue, a command queue controller and a command information storage. The command queue may be configured to store a plurality of commands for controlling the operation of the device. The command queue controller may be configured to control an operation of the command queue. The command information storage may be configured to store command information corresponding to each of the commands stored in the command queue. The command queue controller may control the command queue by checking at least some of the commands stored in the command queue based on the command information and converting to the checked commands based on a result of the checking.

A device for processing commands in accordance with an embodiment of the present disclosure may include a queue and a controller. The queue may be configured to queue, according to a first-in-first-out (FIFO) scheme, one or more commands corresponding to requests provided from an external source. The controller may be configured to sequentially provide a memory device with the queued commands according to a sequence for controlling the memory device to perform operations. The controller may be further configured to remove queued commands from a head of the queue, identify the removed commands, and return the removed and identified commands to an end of the queue, sequentially, and perform one or more among operations of removing, combining, and changing the sequence of the queued commands, based on a result of the identification, by removing the queued commands from the head of the queue and returning the removed commands to the end of the queue.

DETAILED DESCRIPTION

Figure 1:
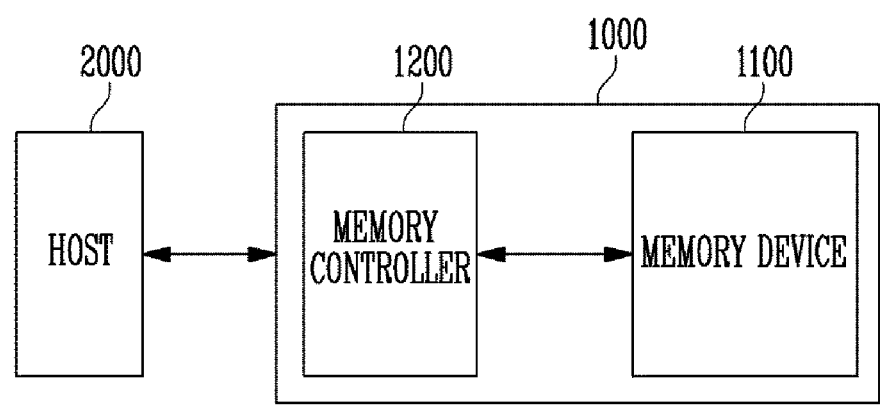
FIG. 1 is a diagram illustrating a memory system including a memory controller in accordance with an embodiment of the present disclosure.

Various embodiments will now be described more fully with reference to the accompanying drawings; however, elements and features may be configured differently than shown and described herein. Thus, the present invention is not limited to the embodiments set forth herein. Rather, these embodiments are provided so that this disclosure is thorough and complete and fully conveys the scope of the embodiments to those skilled in the art. Also, throughout the specification, reference to "an embodiment," "another embodiment," or the like is not necessarily to only one embodiment, and different references to any such phrase are not necessarily to the same embodiment(s).

In the drawing figures, dimensions may be exaggerated for clarity of illustration. It will be understood that when an element is referred to as being "between" two elements, it can be the only element between the two elements, or one or more intervening elements may also be present.

Embodiments will be described with reference to the accompanying drawings. Embodiments are described herein with reference to schematic and sectional illustrations of devices, intermediate structures, and components. As such, variations from the shapes of components in the illustrations as a result, for example, of manufacturing techniques and/or tolerances, are to be expected. Thus, embodiments should not be construed as limited to the particular shapes or regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to identify various components, but they do not limit such components. Those terms are only used for the purpose of differentiating a component from other components that otherwise have the same or similar names. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural from and vice versa, unless the context indicates otherwise. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

FIG. 1 is a diagram for explaining a memory system 1000 including a memory controller 1200 in accordance with an embodiment of the present disclosure.

Referring to FIG. 1, the memory system 1000 may include a memory device 1100 configured to store data, and the memory controller 1200 configured to control the memory device 1100 under control of a host 2000.

The host 2000 may communicate with the memory system 1000 using an interface protocol such as a peripheral component interconnect-express (PCI-E) protocol, an advanced technology attachment (ATA) protocol, a serial ATA (SATA) protocol, a parallel ATA (PATA) protocol, or a serial attached SCSI (SAS) protocol. However, the interface protocol for data communication between the host 2000 and the memory system 1000 is not limited to the foregoing examples; any one of other interface protocols such as a universal serial bus (USB) protocol, a multi-media card (MMC) protocol, an enhanced small disk interface (ESDI) protocol, and an integrated drive electronics (IDE) protocol may also be used.

The memory controller 1200 may control the overall operation of the memory system 1000 and data exchange between the host 2000 and the memory device 1100. For instance, the memory controller 1200 may control the memory device 1100 to program or read data in response to a request of the host 2000. Furthermore, the memory controller 1200 may control the memory device 1100 such that information is stored in main memory blocks and sub-memory blocks included in the memory device 1100, and a program operation is performed on the main memory blocks or the sub-memory blocks depending on the amount of data loaded for the program operation. In an embodiment, the memory device 1100 may include a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), or a flash memory.

The memory device 1100 may perform a program operation, a read operation, or an erase operation under control of the memory controller 1200. Detailed configuration and operation of the memory device 1100 will be described with reference to FIG. 2 by way of example.

The memory controller 1200 in accordance with an embodiment of the present disclosure may sequentially check, in a pop and push scheme, commands stored in a command queue Furthermore, the memory controller 1200 may convert at least one of the commands stored in the command queue, based on the result of the checking. Therefore, the command queue of the memory controller 1200 may be efficiently used. The memory controller 1200 in accordance with an embodiment of the present disclosure will be described in more detail with reference to FIG. 3.

Figure 2:
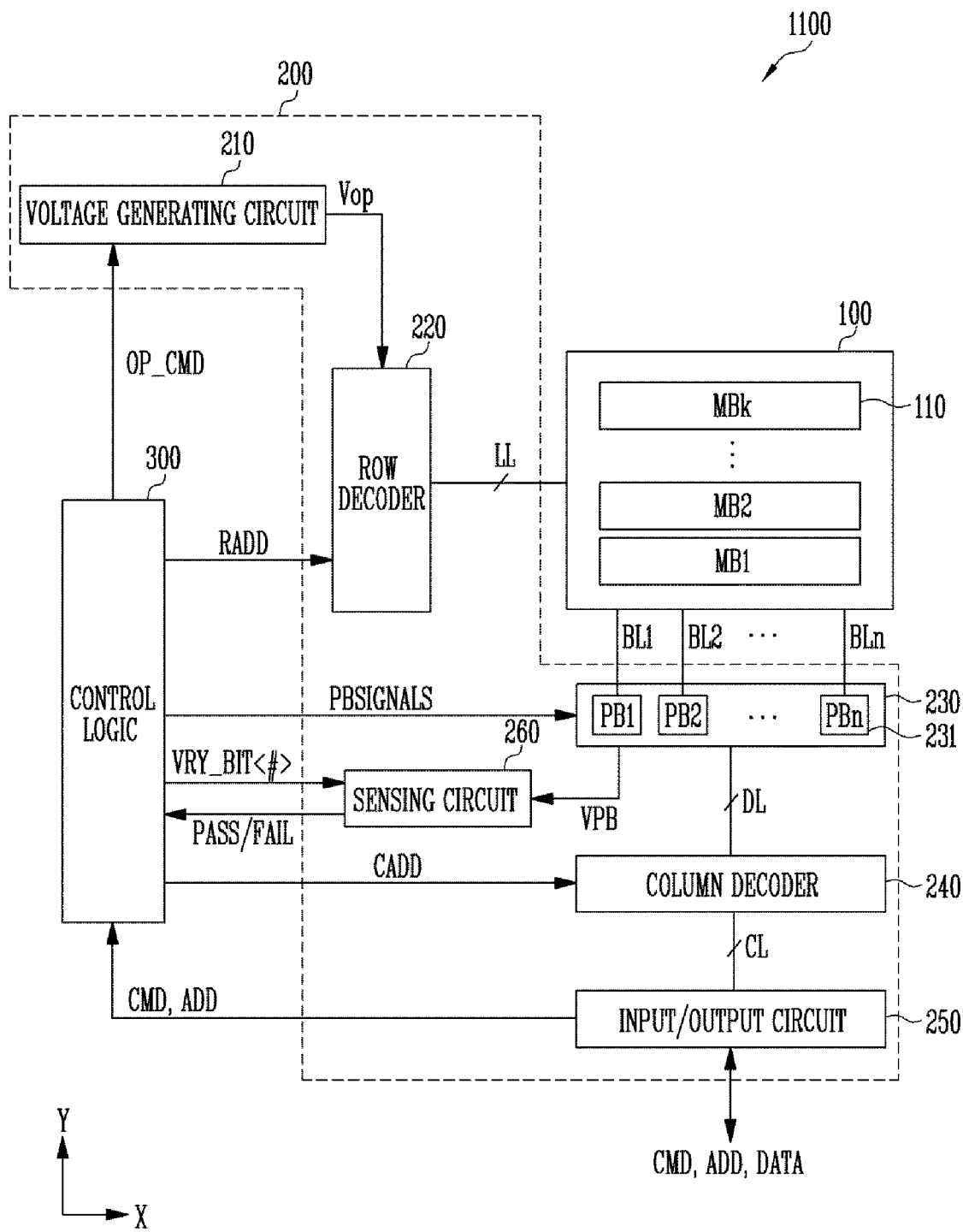
FIG. 2 is a diagram illustrating a memory device of FIG. 1 in accordance with an embodiment of the present disclosure.

FIG. 2 is a diagram illustrating the memory device 1100 of FIG. 1.

Referring to FIG. 2, the memory device 1100 may include a memory cell array 100 configured to store data. The memory device 1100 may include peripheral circuits 200 configured to perform a program operation for storing data in the memory cell array 100, a read operation for outputting the stored data, and an erase operation for erasing the stored data. The memory device 1100 may include a control logic 300 configured to control the peripheral circuits 200 under control of the memory controller (1200 of FIG. 1).

The memory cell array 100 may include a plurality of memory blocks MB1 to MBk (110; k is a positive integer). Local lines LL and bit lines BL1 to BLn (n is a positive integer) may be coupled to each of the memory blocks MB1 to MBk (110). For example, the local lines LL may include a first select line, a second select line, and a plurality of word lines arranged between the first and second select lines. Furthermore, the local lines LL may include dummy lines arranged between the first select line and the word lines and between the second select line and the word lines. Here, the first select line may be a source select line, and the second select line may be a drain select line. For example, the local lines LL may include word lines, drain and source select lines, and source lines SL. For example, the local lines LL may further include dummy lines. For example, the local lines LL may further include pipelines. The local lines LL may be coupled to each of the memory blocks MB1 to MBk (110). The bit lines BL1 to BLn may be coupled in common to the memory blocks MB1 to MBk (110). The memory blocks MB1 to MBk (110) may be embodied in a two- or three-dimensional structure. For example, in the memory blocks 110 having a two-dimensional structure, the memory cells may be arranged in a direction parallel to a substrate. For example, in the memory blocks 110 having a three-dimensional structure, the memory cells may be stacked in a direction perpendicular to the substrate.

The peripheral circuits 200 may perform a program operation, a read operation, or an erase operation on a selected memory block 110 under control of the control logic 300. For example, under control of the control logic 300, the peripheral circuits 200 may supply a verify voltage and pass voltages to the first select line, the second select line, and the word lines, selectively discharge the first select line, the second select line, and the word lines, and verify memory cells coupled to a selected word line among the word lines. For instance, the peripheral circuits 200 may include a voltage generating circuit 210, a row decoder 220, a page buffer group 230, a column decoder 240, an input/output circuit 250, and a sensing circuit 260.

The voltage generating circuit 210 may generate various operating voltages Vop to be used for the program, read, and erase operations in response to an operating signal OP_CMD. Furthermore, the voltage generating circuit 210 may selectively discharge the local lines LL in response to an operating signal OP_CMD. For example, the voltage generating circuit 210 may generate a program voltage, a verify voltage, pass voltages, a turn-on voltage, a read voltage, an erase voltage, a source line voltage, etc. under control of the control logic 300.

The row decoder 220 may transmit operating voltages Vop to local lines WL coupled to a selected memory block 110 in response to a row address RADD.

The page buffer group 230 may include a plurality of page buffers PB1 to PBn (231) coupled to the bit lines BL1 to BLn. The page buffers PB1 to PBn (231) may operate in response to page buffer control signals PBSIGNALS. For instance, the page buffers PB1 to PBn (231) may temporarily store data received through the bit lines BL1 to BLn or sense voltages or currents of the bit lines BL1 to BLn during a read or verify operation.

The column decoder 240 may transmit data between the input/output circuit 250 and the page buffer group 230 in response to a column address CADD. For example, the column decoder 240 may exchange data with the page buffers 231 through data lines DL or exchange data with the input/output circuit 250 through column lines CL.

The input/output circuit 250 may transmit a command CMD or an address ADD received from the memory controller 1200 to the control logic 300, or exchange data DATA with the column decoder 240.

During a read operation or a verify operation, the sensing circuit 260 may generate a reference current in response to an allowable bit VRY_BIT<#>, and may compare a sensing voltage VPB received from the page buffer group 230 with a reference voltage generated by the reference current and output a pass signal PASS or a fail signal FAIL.

The control logic 300 may output an operating signal OP_CMD, a row address RADD, page buffer control signals PBSIGNALS, and an allowable bit VRY_BIT<#> in response to a command CMD and an address ADD, and thus control the peripheral circuits 200. In addition, the control logic 300 may determine whether a target memory cell has passed or failed a verify operation in response to a pass or fail signal PASS or FAIL.

Figure 3:
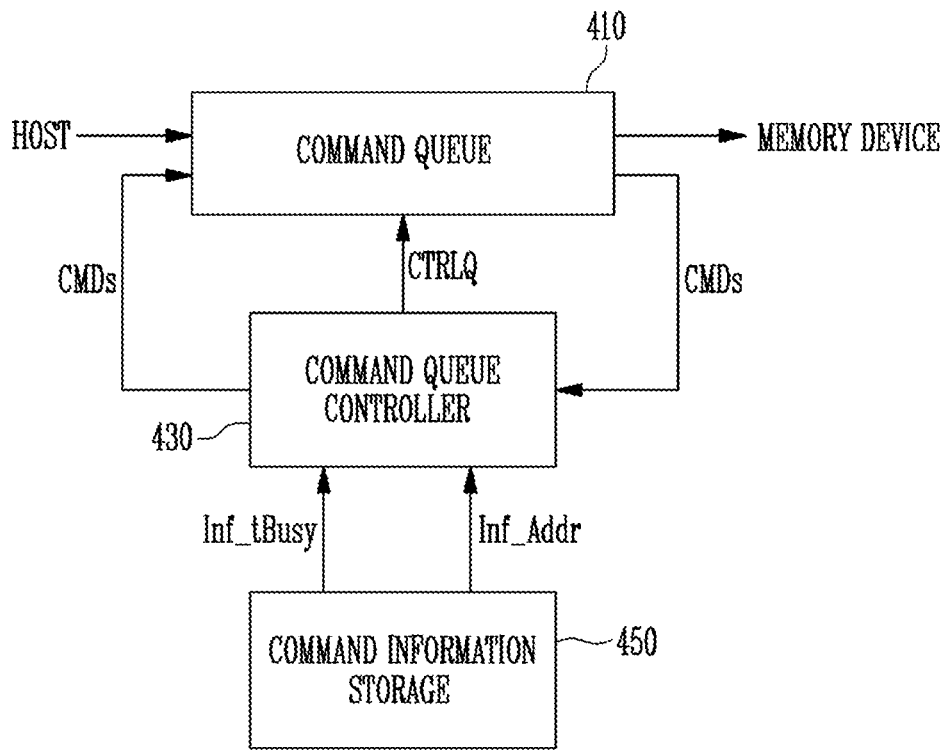
FIG. 3 is a block diagram illustrating a memory controller in accordance with an embodiment of the present disclosure.

FIG. 3 is a block diagram illustrating a memory controller 1200 in accordance with an embodiment of the present disclosure.

Referring to FIG. 3, the memory controller in accordance with an embodiment of the present disclosure may include a command queue 410, a command queue controller 430, and a command information storage 450.

The command queue 410 may store commands received from the host. The commands stored in the command queue 410 may be transmitted to the memory device. The memory device may perform operations in response to the received commands.

The command queue controller 430 may control the operation of the command queue 410. In detail, the command queue controller 430 may apply a queue control signal CTRLQ to the command queue 410 to control the command queue 410. The queue control signal CTRLQ may include a pop signal or a push signal. If the pop signal is applied, a command stored at the head of the command queue 410 may be outputted. If the push signal and the command are applied, the applied command may be stored at the end of the command queue 410.

Commands CMDs outputted from the command queue 410 are transmitted to the command queue controller 430. The command queue controller 430 may check each outputted command and apply a push signal and the checked command to the command queue 410. Thereby, the checked command may be stored in the command queue 430 again. In the memory controller according to an embodiment of the present disclosure, the command queue controller 430 may check all of the commands CMDs stored in the command queue 410 as the pop signal and the push signal are repeatedly inputted to the command queue 410. Based on the result of the checking, the command queue controller 430 may convert at least one of the commands CMDs stored in the command queue 410.

The command information storage 450 may store command information corresponding to each of the commands CMDs stored in the command queue 410. For example, the command information storage 450 may store busy time information Inf_tBusy which is information about the time it takes to perform each of the commands CMDs stored in the command queue 410. The command information storage 450 may store address information Inf_Addr of each of the commands CMDs stored in the command queue 410. The command queue controller 430 may receive the busy time information Inf_tBusy and the address information Inf_Addr of the respective commands CMDs from the command information storage 450, and convert at least one of the commands CMDs based on the busy time information Inf_tBusy and the address information Inf_Addr. The busy time information Inf_tBusy and the address information Inf_Addr of a command may configure command information corresponding to the command.

The conversion of the commands CMDs may include erasing to a command, combining commands, and changing the sequence of the commands. The conversion of the commands CMDs will be described in detail later herein with reference to FIGS. 5A to 8F.

The command queue controller 430 of the memory controller in accordance with an embodiment of the present disclosure may sequentially scan the commands CMDs stored in the command queue 410, based on a pop signal and a push signal. Thereafter, the command queue controller 430 may convert at least one of the commands CMDs stored in the command queue 410 based on the result of the scanning and the command information, i.e., the busy time information Inf_tBusy and the address information Inf_Addr, transmitted from the command information storage 450. Consequently, the command queue 410 of the memory controller may be more efficiently used, and the throughput between the memory controller and the memory device or between the memory controller and the host may be increased.

Figure 4:
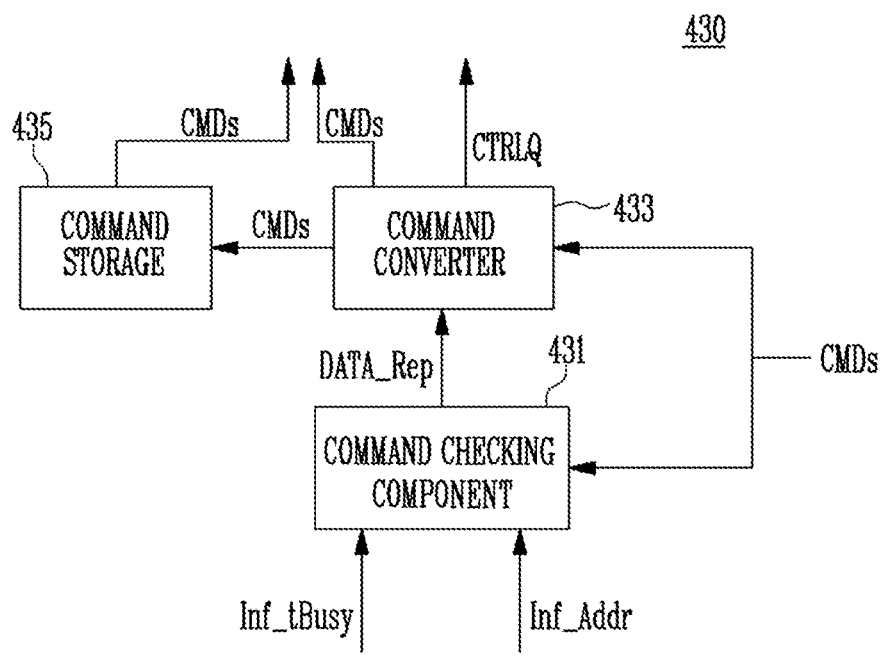
FIG. 4 is a block diagram illustrating an example of a command queue controller shown in FIG. 3.

FIG. 4 is a block diagram illustrating an embodiment of the command queue controller 430 shown in FIG. 3. Referring to FIG. 4, the command queue controller 430 may include a command checking component 431, a command converter 433, and a command storage 435.

The command checking component 431 may check the commands CMDs that are sequentially scanned. In detail, the command checking component 431 may check applied commands CMDs, based on the command information, i.e., the busy time information inf_tBusy and the address information Inf_Addr, transmitted form the command information storage 450. The command checking component 431 may generate check-result data DATA_Rep as the result of checking the commands CMDs. The check-result data DATA_Rep may be data instructing to converting a specific command. The generated check-result data DATA_Rep is transmitted to the command converter 433.

The command converter 433 may generate a queue control signal CTRLQ and transmit it to the command queue 410. Thereby, the command queue 410 is operated based on the queue control signal CTRLQ generated by the command converter 433. As described above, the queue control signal CTRLQ may include a pop signal or a push signal. In FIG. 4, there is illustrated an example where the command converter 433 generates the queue control signal CTRLQ. However, the present invention is not limited to this configuration. For example, the command checking component 431, rather than the command converter 433, may generate the queue control signal CTRLQ and transmit it to the command queue 410.

The command converter 433 may receive commands CMDs from the command queue 410. A received command may be a command outputted from the head of the command queue 410 in response to a pop signal. Furthermore, the command converter 433 may transmit commands CMDs to the command queue 410. Here, a command along with a push signal may be transmitted to the command queue 410. Therefore, the transmitted command may be stored at the end of the command queue 410.

While the command checking component 431 scans the commands CMDs of the command queue 410, the command converter 433 may receive each of the commands CMDs outputted from the command queue 410 and apply each command along with a push signal to the command queue 410 again. Therefore, when the command checking component 431 completes the operation of scanning the commands, the command queue 410 may store the commands that have been stored therein at the initial stage, in the same sequence as that of the initial stage. A detailed process of outputting commands from the command queue 410 and re-inputting the commands to the command queue 410 as the operation of scanning the commands CMDs is performed will be described in detail later herein with reference to FIGS. 5A to 5I.

If the operation of scanning the commands CMDs is completed, the command checking component 431 may generate check-result data DATA_Rep. The generated check result data DATA_Rep is transmitted to the command converter 433. The command converter 433 may convert at least one of the commands CMDs stored in the command queue 410, based on the received check result data DATA_Rep. In more detail, the command converter 433 may convert at least one of the commands CMDs while repeatedly applying the pop signal and the push signal to the command queue 410. The conversion of a command by the command converter 433 will be described in detail later herein with reference to FIGS. 6 to 8F.

The command storage 435 may store at least some of the commands CMDs outputted from the command queue 410. In detail, the command storage 435 may temporarily store at least some of the commands CMDs to allow the command converter 433 to convert at least one of the commands CMDs of the command queue 410 by using the at least some of the commands CMDs temporarily stored in the command storage 435.

In an embodiment, the command storage 435 may back up commands that have been stored in the command queue 410. In other words, the command storage 435 may store the commands that have been stored in the command queue 410 before the commands are converted by the command converter 433. Even after at least some of the commands that have been stored in the command queue 410 are converted by the command checking component 431 and the command converter 433, one or more converted commands may be restored to their original forms in the command queue 410 as needed.

In the memory controller in accordance with an embodiment of the present disclosure, the command checking component 431 of the command queue controller 430 may sequentially check the commands CMDs stored in the command queue 410. Subsequently, the command checking component 431 may generate check-result data DATA_Rep which is data indicating the result of checking the commands CMDs, and transmit the check-result data DATA_Rep to the command converter 433. The command converter 433 may convert at least one of the commands CMDs stored in the command queue 410, based on the check-result data DATA_Rep. During this process, the command(s) CMDs stored in the command queue 410 may be stored in the command storage 435.

Consequently, in the memory controller in accordance with an embodiment of the present disclosure, the command queue 410 may be more efficiently used, and the throughput between the memory controller and the memory device or between the memory controller and the host may be increased.

FIGS. 5A to 5I are diagrams for explaining a process of scanning commands CMDs stored in a command queue 410 in accordance with an embodiment of the present disclosure.

Figure 5A:
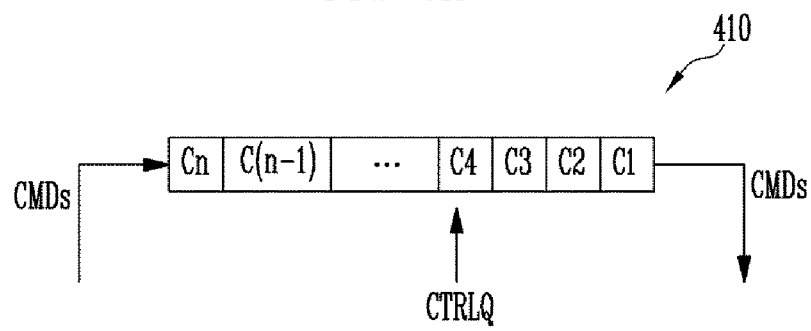
FIGS. 5A to 5I are diagrams for explaining a process of scanning commands CMDs stored in a command queue 410 in accordance with an embodiment of the present disclosure.

Referring to FIG. 5A, there is illustrated an example where commands C1, C2, C3, C4, . . . , C(n-1), and Cn are stored in the command queue 410. The first command C1 is stored at the head of the command queue 410, and the n-th command Cn is stored at the end of the command queue 410. The command queue 410 may store or output commands based on the queue control signal CTRLQ. With reference also to FIG. 4, the process of scanning the commands CMDs will be described.

Figure 5B:
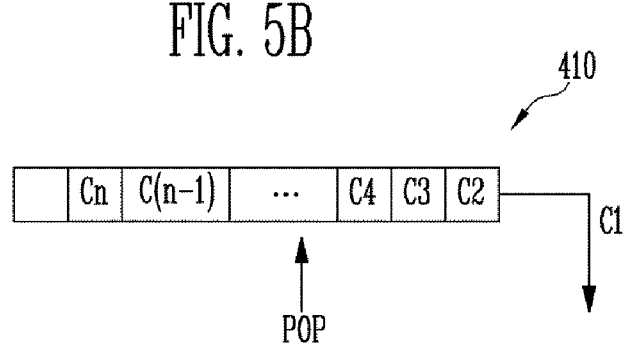

Referring to FIG. 5B, the command converter 433 may transmit a pop signal to the command queue 410. Then, the first command C1 that has been stored at the head of the command queue 410 is outputted. The outputted first command C1 is transmitted to the command checking component 431 and the command converter 433. The command checking component 431 temporarily stores the first command C1 and related information Inf_tBusy and Inf_Addr to a check table. The check table will be described later with reference to [Table 1].

Figure 5C:
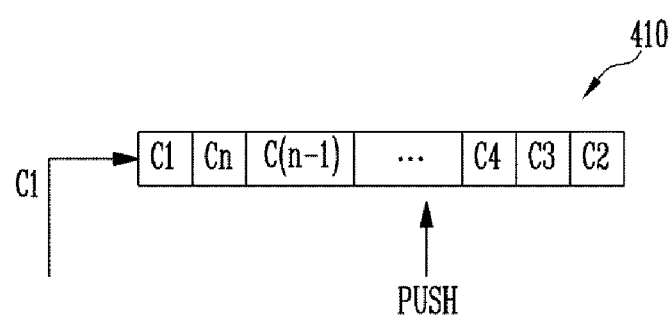

Thereafter, referring to FIG. 5C, the command converter 433 applies a push signal and the first command C1 to the command queue 410. Then, the first command C1 is stored at the end of the command queue 410. In addition, as shown in the drawing, the second command C2 is stored in the head of the command queue 410.

Figure 5D:
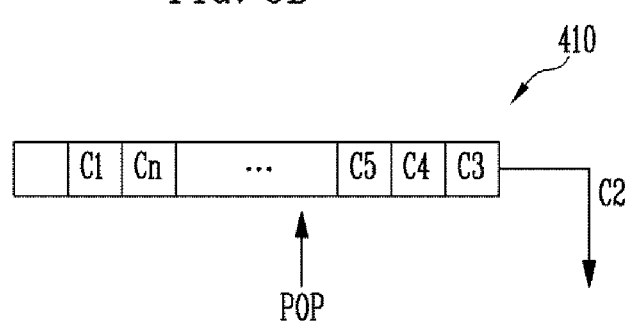

Referring to FIG. 5D, the command converter 433 may transmit a pop signal to the command queue 410. Thereby, the second command C2 that has been stored in the head of the command queue 410 is outputted. The outputted second command C2 is transmitted to the command checking component 431 and the command converter 433. The command checking component 431 temporarily stores the second command C2 and related information Inf_tBusy and Inf_Addr in the check table.

Figure 5E:
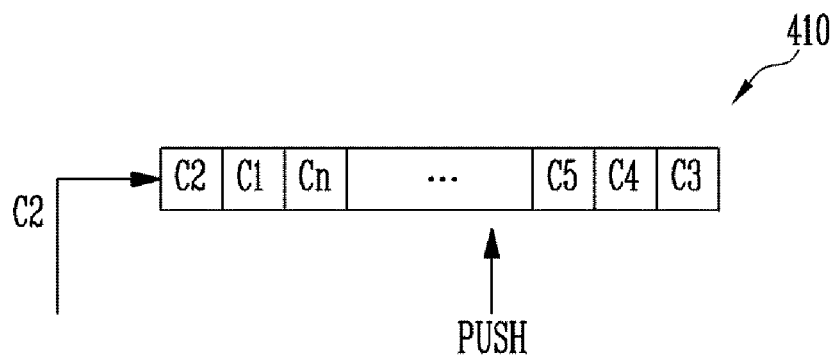

Thereafter, referring to FIG. 5E, the command converter 433 applies a push signal and the second command C2 to the command queue 410. Thereby, the second command C2 is stored at the end of the command queue 410. In addition, as shown in the drawing, the third command C3 is stored at the head of the command queue 410.

Figure 5F:
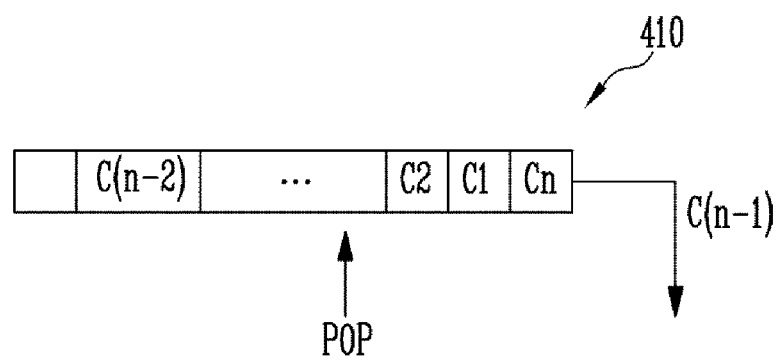

As the process illustrated in FIGS. 5B to 5E is repeatedly performed, the commands CMDs of the command queue 410 may be sequentially checked by the command checking component 431 and then re-inputted to the command queue 410. Referring to FIG. 5F, there is illustrated the case where the first to n−2-th commands C1 to C(n−2) have been checked and re-stored in the command queue 410 by repetition of the above-mentioned process. As shown in FIG. 5F, the command converter 433 may transmit a pop signal to the command queue 410. Thereby, the n−1-th command C(n−1) that has been stored at the head of the command queue 410 is outputted. The outputted n−1-th command C(n−1) is transmitted to the command checking component 431 and the command converter 433. The command checking component 431 temporarily stores the n−1-th command C(n−1) and related information Inf_tBusy and Inf_Addr in the check table.

Figure 5G:
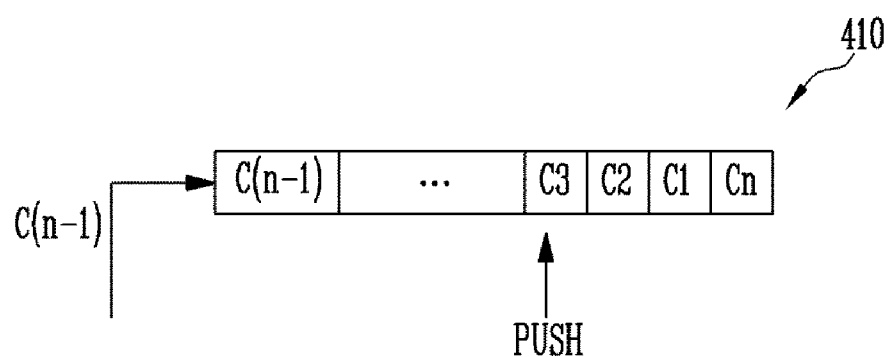

Thereafter, referring to FIG. 5G, the command converter 433 applies a push signal and the n−1-th command C(n−1) to the command queue 410. Thereby, the n−1-th command C(n−1) is stored at the end of the command queue 410.

Figure 5H:
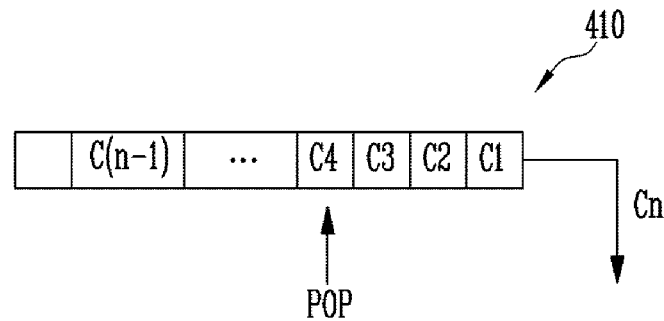

Referring to FIG. 5H, the command converter 433 may transmit a pop signal to the command queue 410. Thereby, the n-th command Cn that has been stored at the head of the command queue 410 is outputted. The outputted n-th command Cn is transmitted to the command checking component 431 and the command converter 433. The command checking component 431 temporarily stores the n-th command Cn and related information Inf_tBusy and Inf_Addr in the check table.

Figure 5I:
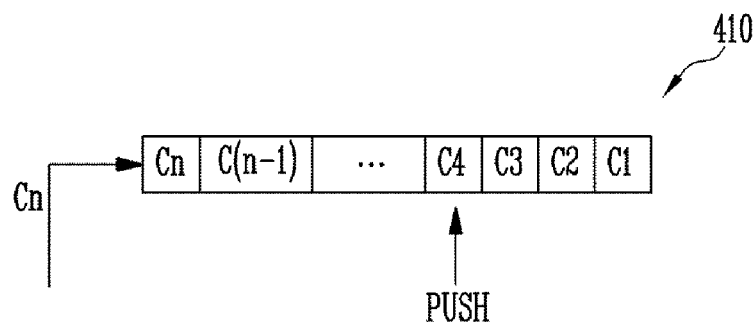

Thereafter, referring to FIG. 5I, the command converter 433 applies a push signal and the n-th command Cn to the command queue 410. Thereby, the n-th command Cn is stored at the end of the command queue 410.

Referring to FIG. 5I, it is to be understood that the commands CMDs stored in the command queue 410 have the same state as the state commands CMDs illustrated in FIG. 5A before the scanning process. In other words, the commands stored in the command queue 410 may make one rotation by applying the pop signals and the push signals to the command queue 410 by the number of commands stored in the command queue 410. While the commands make one rotation, the command checking component 431 may generate the check table based on commands making the rotation and related command information. In this way, the memory controller in accordance with an embodiment of the present disclosure may scan all of the commands CMDs stored in the command queue 410, without changing the commands CMDs.

Figure 6:
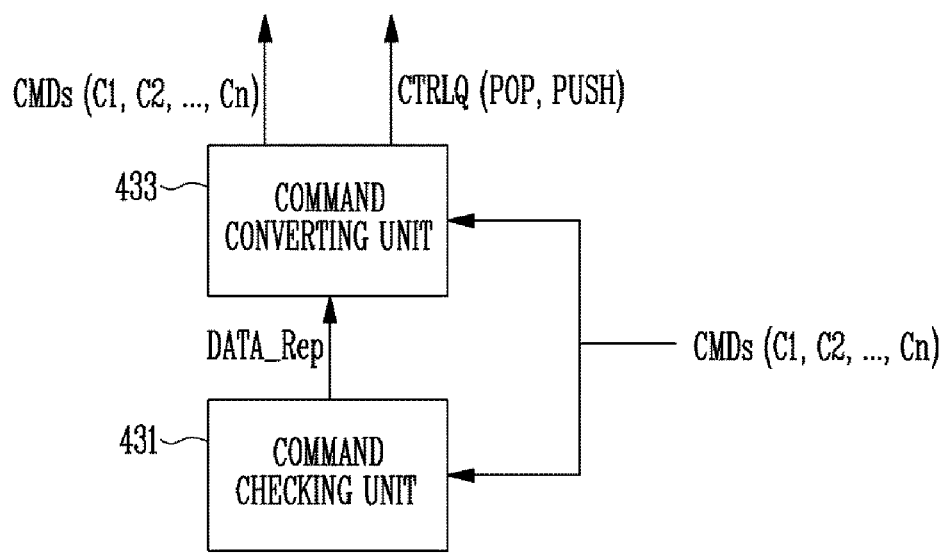
FIG. 6 is a block diagram illustrating the operation of a command checking component 431 and a command converter 433 according to a command scanning process in accordance with an embodiment of the present disclosure.

FIG. 6 is a block diagram illustrating the operation of the command checking component 431 and the command converter 433 according to a command scanning process in accordance with an embodiment of the present disclosure.

As the commands CMDs are scanned in the scheme shown in FIGS. 5A to 5I, the commands C1, C2, . . . , Cn that have been stored in the command queue 410 are sequentially transmitted to the command checking component 431 and the command converter 433. The command converter 433 applies pop signals and push signals to the command queue 410 to sequentially output commands from the command queue 410 and then re-store the commands to the command queue 410.

During the process of scanning the commands CMDs, the command checking component 431 may generate the check table, based on scanned commands CMDs and related command information. Furthermore, the command checking component 431 may internally and temporarily store the generated check table. To this end, the command checking component 431 may include a storage (not illustrated) for storing the check table. For instance, the command checking component 431 may generate the check table, as shown in Table 1, and temporarily store the check table.

TABLE 1

|  | C1 | C2 | C3 | C4 | ... Cn |
|---|---|---|---|---|---|
| Busy Time | T1 | T2 | T3 | T4 | ... Tn |
| Sequence Change Allowed | Y | N | N | Y | ... Y |
| Block Address | BA1 | BA2 | BA3 | BA4 | ... BAn |
| Page Address | PGA1 | PGA2 | PGA3 | PGA4 | ... PGAn |
| Plane Information | PLN1 | PLN2 | PLN3 | PLN4 | ... PLNn |

Referring to the check table shown in Table 1, with regard to the respective commands C1, C2, C3, C4, . . . , Cn, busy times T1, T2, T3, T4, . . . , Tn, information about whether a sequence change is allowed (Yes (Y) or No (N)), block addresses BA1, BA2, BA3, BA4, . . . , BAn, page addresses PGA1, PGA2, PGA3, PGA4, . . . , PGAn, and plane information PLN1, PLN2, PLN3, PLN4, . . . , PLNn may be stored in the check table. After the process of scanning the commands CMDs has been completed, the command checking component 431 may generate check-result data DATA_Rep for converting at least one of the commands CMDs based on the generated check table.

In an embodiment, the command checking component 431 may change a sequence of the commands based on the busy times. For example, the sequence of the commands may be changed such that the commands are outputted in a sequence from the shortest busy time to the longest busy time. In this case, since a command having a comparatively short busy time is outputted first, the number of commands which are waiting in the command queue may be reduced.

For example, if the busy time T4 of the fourth command C4 is shorter than the busy time T1 of the first command C1, the turns of the first and fourth commands C1 and C4, in terms of their relative output sequence, may be changed with each other. In such a command sequence change, the command checking component 431 may determine to change the output sequence of the first and fourth commands C1 and C4. In Table 1, with regard to the item "Sequence Change Allowed", "Y" denotes that the turn of the corresponding command may be changed, and "N" denotes that the turn of the corresponding command cannot be changed. For example, since the sequence changes of both of the second command C2 and the third command C3 are not allowed ("N" in table 1), the turns of the second command C2 and the third command C3 may not be allowed to be changed. On the other hand, since the sequence changes of both of the first command C1 and the fourth command C4 are allowed ("Y" in table 1), the turns of the commands may be allowed to be changed based on the busy times. In this case, the check-result data DATA_Rep may include data instructing to change the turns of the first command C1 and the fourth command C4.

In an embodiment, the command checking component 431 may erase at least one command based on addresses of data. For example, both the first command C1 and the fourth command C4 may be read commands and indicate the same physical address. In other words, the block addresses BA1 and BA4, the page addresses PGA1 and PGA4, and the plane information PLN1 and PLN4 of the first and fourth commands C1 and C4 may be the same as each other. This case means that read commands C1 and C4 for the same data have been repeatedly inputted. Hence, the memory controller 1200 may transmit only the first command C1 to the memory device, cache read data, and then repeatedly transmit the data to the host in response to the requests corresponding to the first and fourth commands C1 and C4. In this case, because the fourth command C4 may be erased, the read operation of the memory device 1100 may be prevented from being unnecessarily repeatedly performed. In this case, the check-result data DATA_Rep may include data instructing to erase the fourth command C4.

In an embodiment, the command checking component 431 may combine two or more commands based on the addresses of data. For example, the first command C1 and the fourth command C4 may indicate successive physical addresses. In other words, the block addresses BA1 and BA4 and the plane information PLN1 and PLN4 of the first and fourth commands C1 and C4 may be the same as each other, and the page addresses PGA1 and PGA4 of the first and fourth commands C1 and C4 may indicate successive physical addresses. In this case, to efficiently use the space of the command queue 410 and ensure efficient operation of the memory device 1100, the first command C1 and the fourth command C4 may be combined into one command C1'. For this operation, the new command C1' may be generated, and the first command C1 and the fourth command C4 may be erased. In this case, the check-result data DATA_Rep may include data instructing to combine the first command C1 and the fourth command C4 with each other (i.e., data instructing to generate the new command C1' and to erase the first and fourth commands C1 and C4).

As described above, the commands CMDs may be converted in various ways so as to increase the throughput between the memory controller 1200 and the memory device or between the memory controller and the host and more efficiently use the command queue 410 of the memory controller. According to a specific need or policy, the command checking component 431 may generate check-result data DATA_Rep instructing to convert the commands CMDs, and may transmit the check-result data DATA_Rep to the command converter 433.

The command converter 433 may convert the commands CMDs stored in the command queue 410, based on the received check-result data DATA_Rep.

Figure 7A:
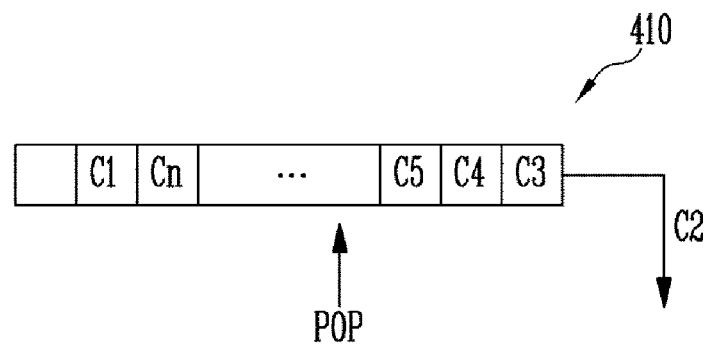
FIGS. 7A to 7C are diagrams for explaining a process of erasing one of the commands CMDs stored in the command queue 410 in accordance with an embodiment of the present disclosure.
Figure 7B:
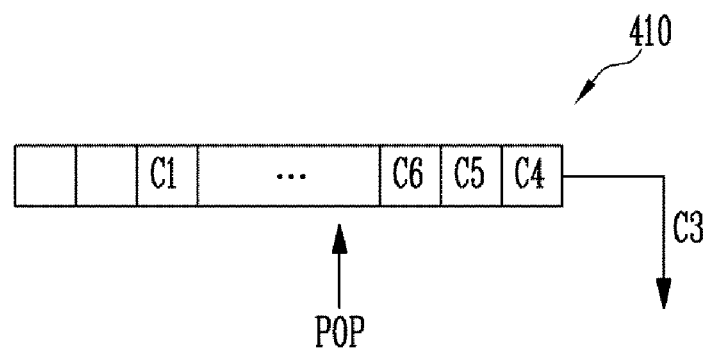
Figure 7C:
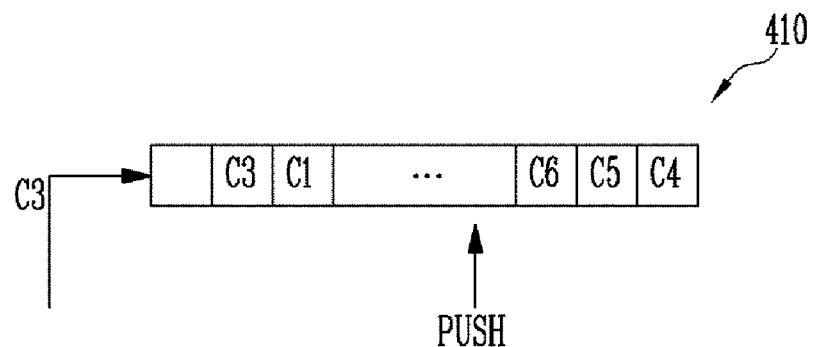

FIGS. 7A to 7C are diagrams for explaining a process of erasing one of the commands CMDs stored in the command queue 410 in accordance with an embodiment of the present disclosure. Description is given for the case where the second command C2 is erased based on the check-result data DATA_Rep received from the command checking component 431.

Referring to FIG. 7A, it is to be understood that the first command C1 is already stored at the end of the command queue 410. In other words, it is to be understood that, before the state of FIG. 7A, the command converter 433 has applied a pop signal and a push signal such that the first command C1 that has been stored at the head of the command queue 410 is stored at the end of the command queue 410.

Under conditions of FIG. 7A in which the first command C1 is stored at the end of the command queue 410 and the second command C2 is stored at the head of the command queue 410, the command converter 433 applies a pop signal to the command queue 410. Thereby, the second command C2 is outputted from the command queue 410. Subsequently, as shown in FIG. 7B, the command converter 433 applies a pop signal to the command queue 410 again. Thereby, the third command C3 is outputted. Thereafter, as shown in FIG. 7C, the command converter 433 applies a push signal and the third command C3 to the command queue 410. Thereby, the third command C3 is stored subsequent to the first command C1. During the foregoing process, the second command C2 is erased from the command queue 410. After the step of FIG. 7C, the command converter 433 may repeatedly and alternately apply pop signals and push signals to the command queue 410 so that the commands of the command queue 410 may be sequentially transferred.

FIGS. 8A to 8F are diagrams for explaining a process of changing the sequence of some of the commands CMDs stored in the command queue 410 in accordance with an embodiment of the present disclosure. Description is given for a process of changing the turn of the first command C1 into a turn between the n−1-th command C(n−1) and the n-th command Cn, based on the check-result data DATA_Rep received from the command checking component 431.

Figure 8A:
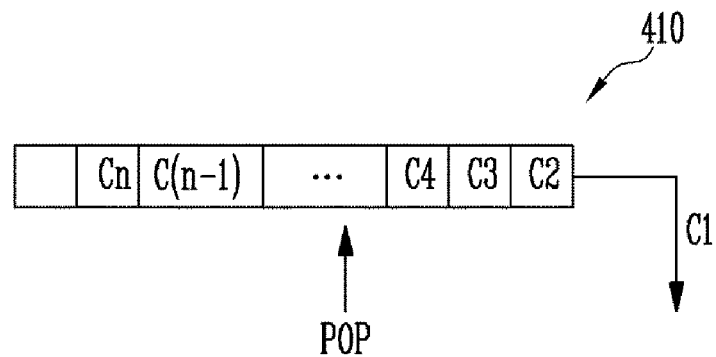
FIGS. 8A to 8F are diagrams for explaining a process of changing the sequence of some of the commands CMDs stored in the command queue 410 in accordance with an embodiment of the present disclosure.

Referring to FIG. 8A, the command converter 433 applies a pop signal to the command queue 410. The first command C1 is outputted from the command queue 410. Because the first command C1 is a command the turn of which is to be changed, the first command C1 is temporarily stored in the command storage 435 shown in FIG. 4.

Figure 8B:
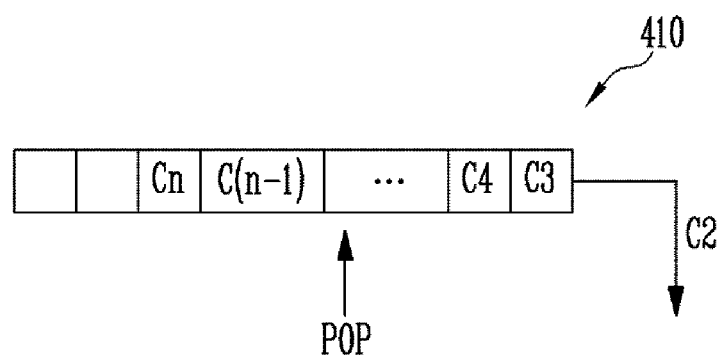

Referring to FIG. 8B, the command converter 433 applies a pop signal to the command queue 410 again. The second command C2 is outputted from the command queue 410. Thereby, the third command C3 is stored at the head of the command queue 410. The first command C1 is still stored in the command storage 435.

Figure 8C:
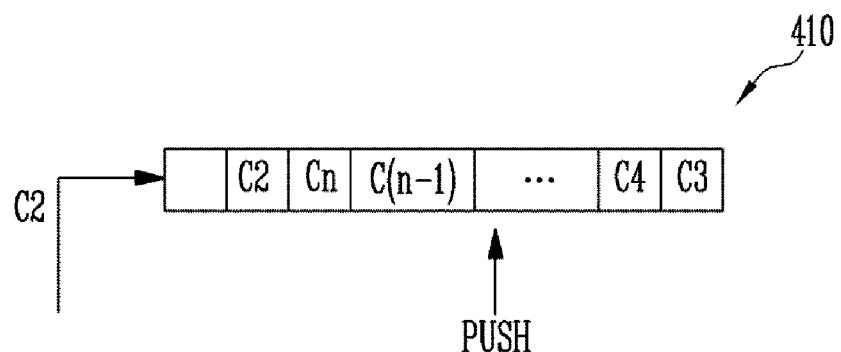

Referring to FIG. 8C, the command converter 433 applies the outputted second command C2 along with a push signal to the command queue 410. Then, the second command C2 is stored at the end of the command queue 410, with the third command C3 stored at the head of the command queue 410. As shown in FIG. 8C, the second command C2 is stored subsequent to the n-th command Cn.

After the step shown in FIG. 8C, the command converter 433 alternately applies pop signals and push signals to circulate only the locations of the commands stored in the command queue 410. In other words, the operation of outputting a command which is at the head of the command queue 410 among the commands stored in the command queue 410 and storing the outputted command at the end of the command queue 410 is repeatedly performed. The foregoing circulation operation is repeatedly performed until the n-th command Cn is stored at the head of the command queue 410 and the n−1-th command C(n−1) is stored at the end of the command queue 410.

Figure 8D:
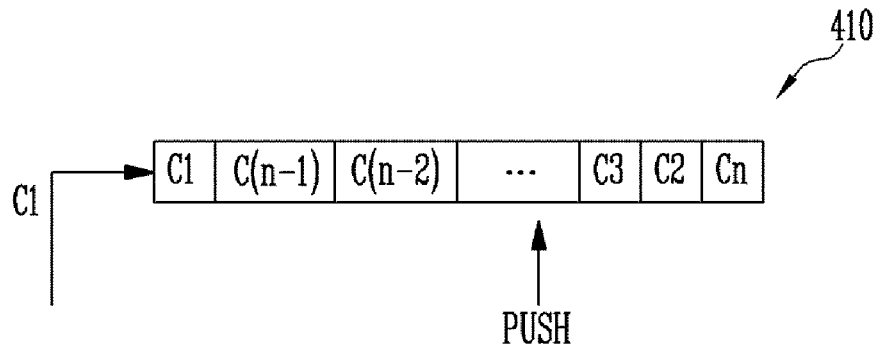

Referring to FIG. 8D, under conditions in which the n-th command Cn is stored at the head of the command queue 410 and the n−1-th command C(n−1) is stored at the end of the command queue 410, the command converter 433 applies, to the command queue 410, a push signal and the first command C1 that has been temporarily stored in the command storage 435. Thereby, the first command C1 is stored at the end of the command queue 410. In other words, the first command C1 is stored subsequent to the n−1-th command C(n−1) in the command queue 410.

Figure 8E:
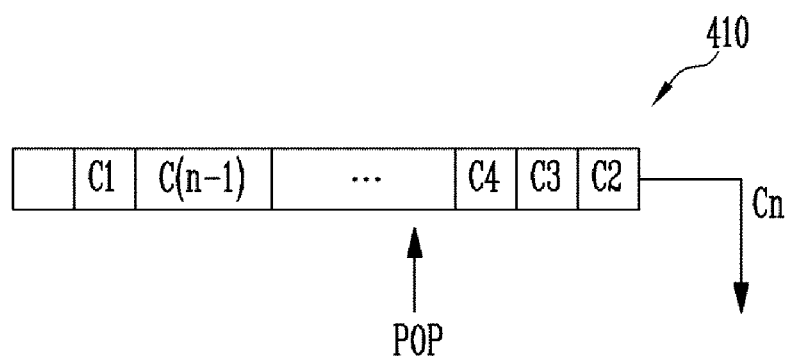
Figure 8F:
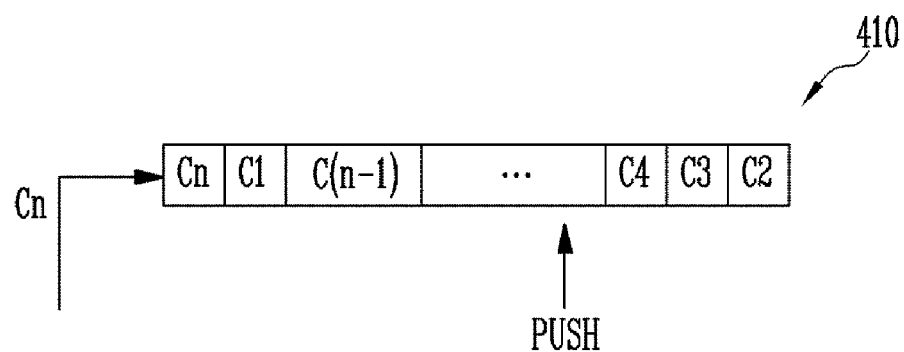

Referring to FIG. 8E, the command converter 433 applies a pop signal to the command queue 410. The n-th command Cn is outputted from the command queue 410. Referring to FIG. 8F, the command converter 433 applies the outputted n-th command Cn along with a push signal to the command queue 410. Thereby, the n-th command Cn is stored subsequent to the first command C1 in the command queue 410. As a result, the turn of the first command C1 is changed into a turn between the n−1-th command C(n−1) and the n-th command Cn.

In FIGS. 8A to 8F, there is illustrated the method of changing the turn of a single command. However, it is to be understood that, as a modification of the method, it is also possible to switch the turns of two commands with each other.

Figure 9:
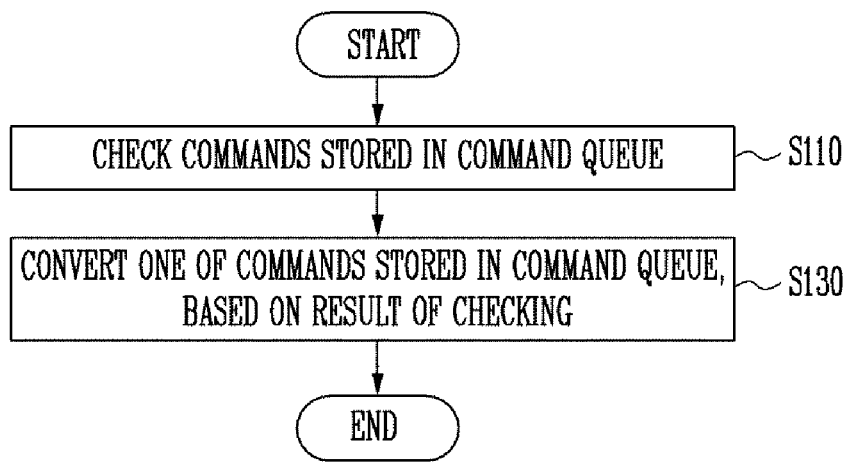
FIG. 9 is a flowchart illustrating a method of operating the memory controller in accordance with an embodiment of the present disclosure.

FIG. 9 is a flowchart illustrating a method of operating a memory controller, e.g., memory controller 1200, in accordance with an embodiment of the present disclosure. Referring to FIG. 9, the method may include step S110 of checking commands stored in the command queue, and step S130 of converting at least one of the commands stored in the command queue based on the result of the checking.

At step S110, as described with reference to FIGS. 5A to 5I, the commands CMDs stored in the command queue 410 are checked. In accordance with an embodiment, at step S110, the commands CMDs stored in the command queue 410 may be checked in a pop and push scheme. The pop and push scheme means that a command stored at the head of the command queue 410 is popped and outputted, the outputted command is checked, and then the corresponding command is pushed and stored at the end of the command queue 410. Consequently, all of the commands stored in the command queue 410 may be scanned without changing the commands CMDs. Detailed configuration of step S110 will be described later with reference to FIG. 10.

At step S130, at least one of the commands CMDs stored in the command queue 410 is converted based on the result of the checking of step S110. Here, the result of the checking of step S110 may be check-result data DATA_Rep generated by the command checking component 431. At step S130, at least one of the commands CMDs stored in the command queue 410 may be erased, or the sequence of the commands CMDs may be changed. Alternatively, at step S130, a plurality of commands stored in the command queue 410 may be combined. Detailed configuration of step S130 will be described later with reference to FIGS. 11 and 12.

Figure 10:
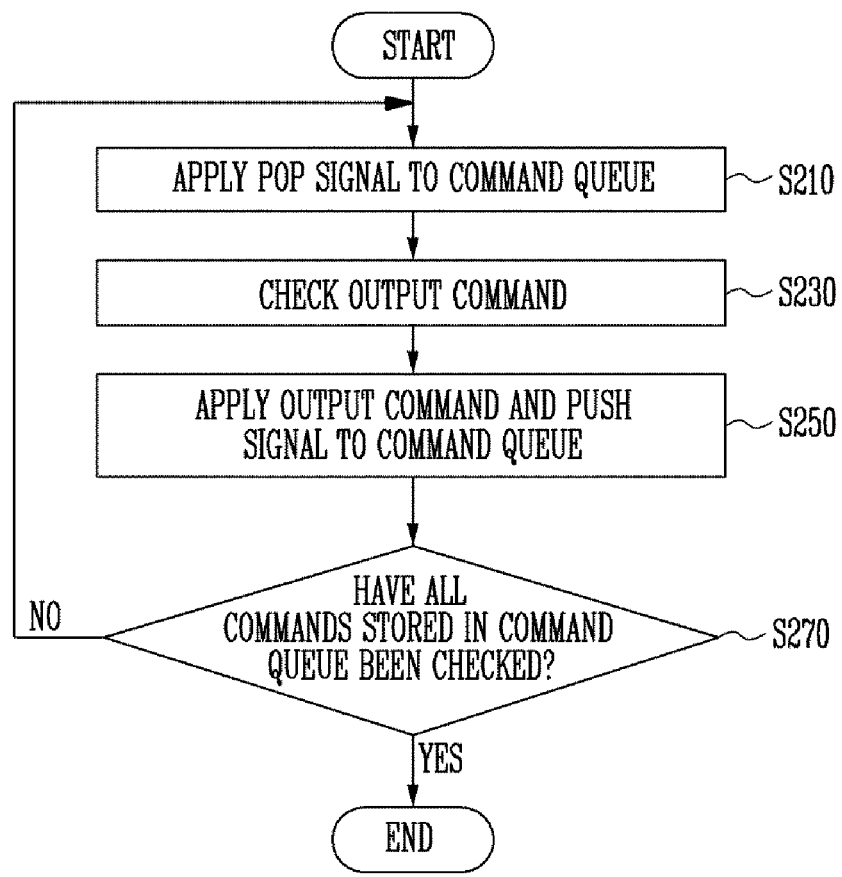
FIG. 10 is a flowchart illustrating an example of a command checking step shown in FIG. 9.

FIG. 10 is a flowchart illustrating the command checking step S110 shown in FIG. 9.

Referring to FIG. 10, at step S210, a pop signal is applied to the command queue 410. When the pop signal is applied to the command queue 410, a command that has been stored at the head of the command queue 410 may be outputted.

Thereafter, the outputted command is checked, at step S230. The checking operation of step S230 may be performed by the command checking component 431. For example, as described above, the command checking component 431 may generate a check table such as Table 1, based on the outputted command and related information Inf_tBusy and Inf_Addr.

Subsequently, the command converter 433 applies the outputted command and a push signal to the command queue 410. Thereby, the check-completed command is stored at the end of the command queue 410.

Thereafter, at step S270, it is determined whether all of the commands stored in the command queue 410 have been completely checked. If all of the commands have not been completely checked, the process returns to step S210 to check a subsequent command stored at the head of the command queue 410 in the pop and push scheme. If all of the commands have been completely checked, the command checking step S110 of FIG. 9 is completed. It is to be understood that the foregoing process is substantially the same as that described with reference to FIGS. 5A to 5I.

Figure 11:
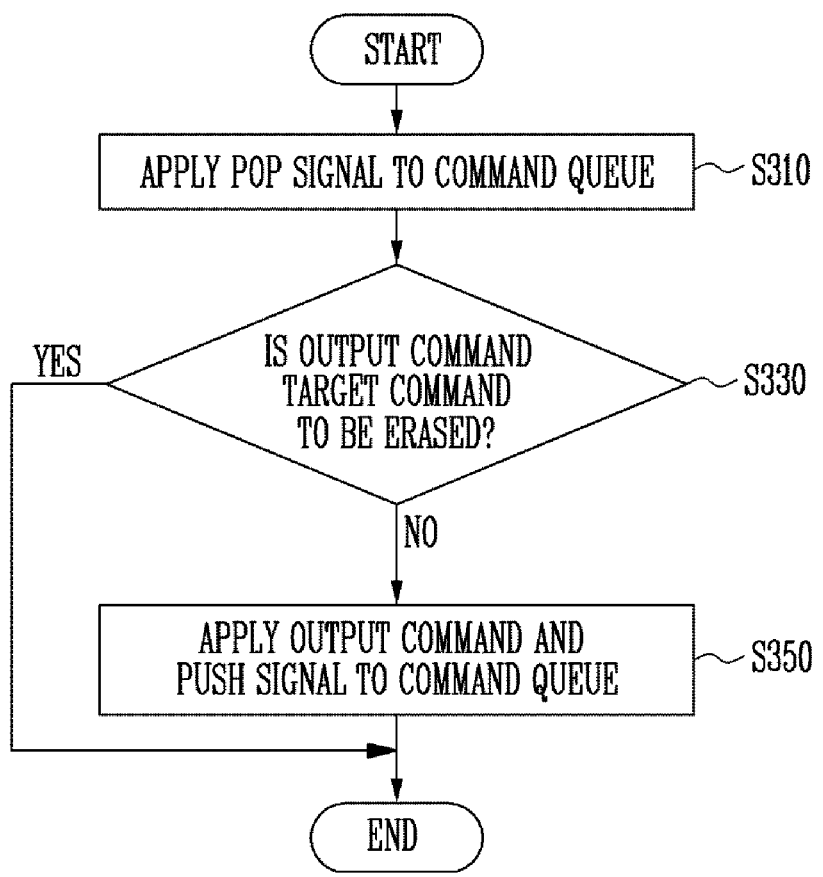
FIG. 11 is a flowchart illustrating an example of a command converting step shown in FIG. 9.

FIG. 11 is a flowchart illustrating an embodiment of the command converting step S130 shown in FIG. 9. FIG. 11 illustrates an operation of erasing a specific command as an example of the command converting operation.

At step S310, a pop signal is applied to the command queue 410. When the pop signal is applied to the command queue 410, a command that has been stored at the head of the command queue 410 may be outputted.

At step S330, it is determined whether the outputted command is a target command to be erased. If the outputted command is the target command to be erased, the process is terminated. In this case, because the outputted command is not inputted to the command queue 410 again, the outputted command is erased.

If the outputted command is not the target to be erased, the outputted command and a push signal are applied to the command queue 410, at step S350. Therefore, the outputted command may not be erased. It is to be understood that the foregoing process is substantially the same as that described with reference to FIGS. 7A to 7C.

Figure 12:
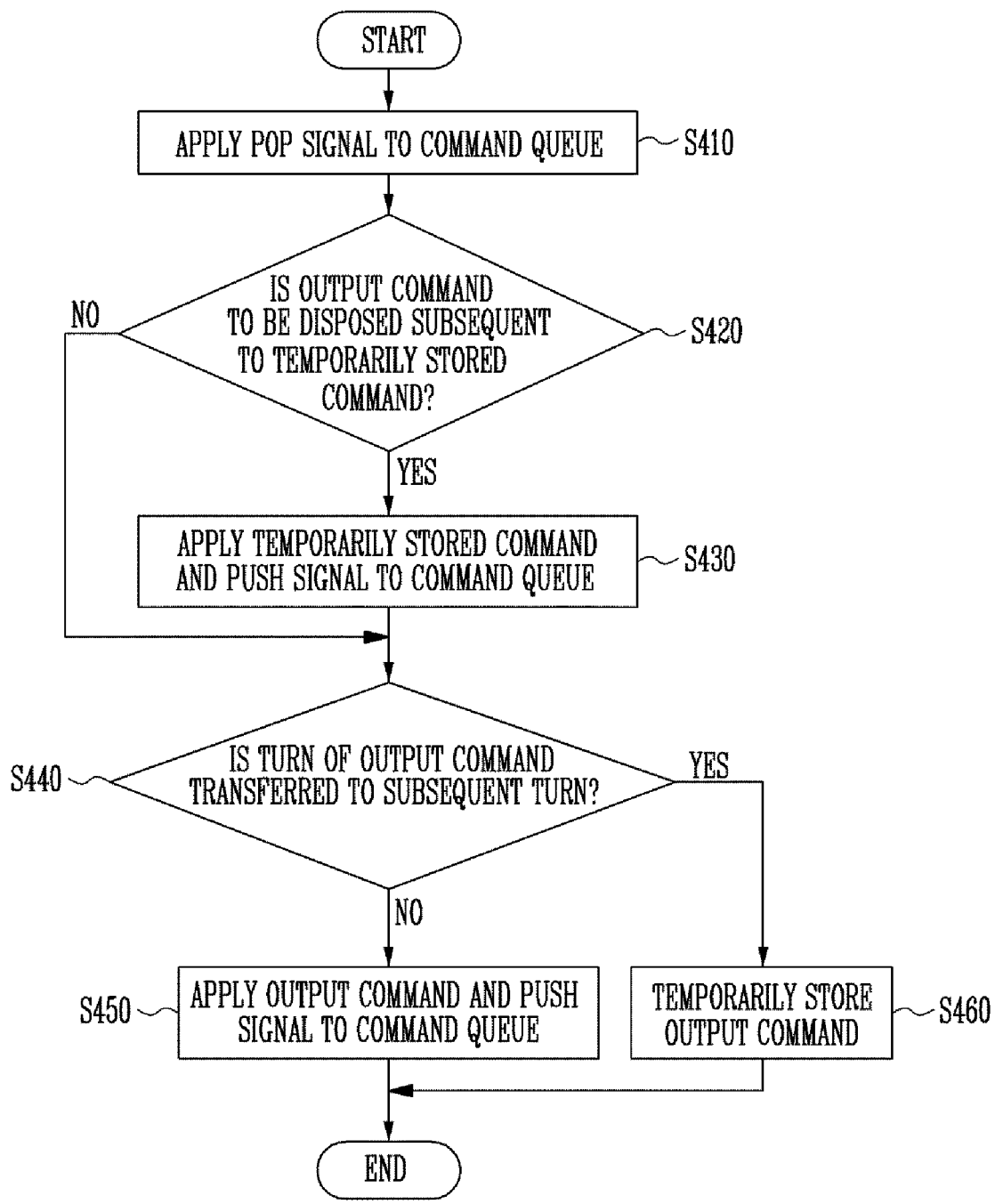
FIG. 12 is a flowchart illustrating an example of the command converting step shown in FIG. 9.

FIG. 12 is a flowchart illustrating another embodiment of the command translation step shown in FIG. 9. FIG. 12 illustrates an operation of changing the turn of a specific command as an example of the command converting operation.

At step S410, a pop signal is applied to the command queue 410. When the pop signal is applied to the command queue 410, a command that has been stored at the head of the command queue 410 may be outputted.

At step S420, it is determined that the outputted command is a command to be disposed subsequent to a temporarily stored command. Here, it is to be understood that the temporarily stored command is one that is previously popped out from the memory queue 410 and temporarily stored in the command storage 435 of FIG. 4.

If the outputted command is to be disposed subsequent to the temporarily stored command, the temporarily stored command must be stored in the command queue earlier than be the outputted command. Therefore, in this case, the process proceeds to step S430 to apply the temporarily stored command and a push signal to the command queue 410.

If the outputted command is to be disposed preceding to the temporarily stored command, the process proceeds to step S440. It is to be understood that if there is no temporarily stored command, the process proceeds to step S440.

Thereafter, it is determined whether the turn of the outputted command must be changed. In other words, it is determined whether the turn of the outputted command must be transferred to a subsequent turn, at step S440. If the turn of the outputted command must be transferred to a subsequent turn, the outputted command is temporarily stored, at step S460. Subsequently, a subsequent command is popped and compared with the temporarily stored command.

If the outputted command is not allowed to be moved to a subsequent turn, the outputted command and a push signal are applied to the command queue 410. Thereby, the outputted command may be stored in the command queue 410 again. Hence, the turn of the outputted command may not be changed.

As described above, in the method of operating the memory controller in accordance with an embodiment, the command queue 410 may be more efficiently used, and the throughput between the memory controller and the memory device or between the memory controller and the host may be increased.

Figure 13:
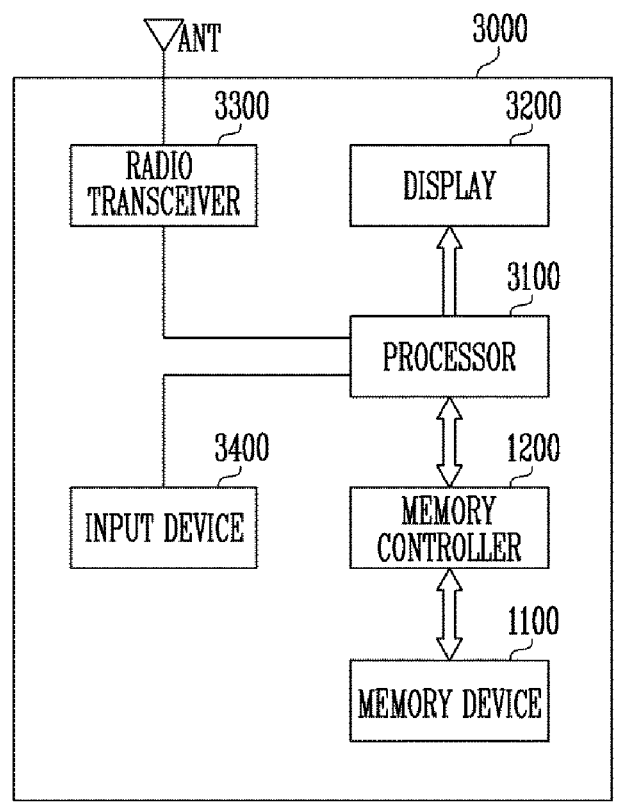
FIG. 13 is a diagram illustrating an example of a memory system including the memory controller shown in FIG. 3.

FIG. 13 is a diagram illustrating an example of a memory system including the memory controller shown in FIG. 3.

Referring to FIG. 13, a memory system 3000 may be embodied in a cellular phone, a smartphone, a tablet PC, a personal digital assistant (PDA) or a wireless communication device. The memory system 3000 may include a memory device 1100, and a memory controller 1200 configured to control the operation of the memory device 1100. The memory controller 1200 may control a data access operation, e.g., a program operation, an erase operation, or a read operation, of the memory device 1100 under control of a processor 3100.

Data programmed in the memory device 1100 may be outputted through a display 3200 under control of the memory controller 1200.

A radio transceiver 3300 may send and receive radio signals through an antenna ANT. For example, the radio transceiver 3300 may change a radio signal received through the antenna ANT into a signal capable of being processed in the processor 3100. Therefore, the processor 3100 may process a signal outputted from the radio transceiver 3300 and transmit the processed signal to the memory controller 1200 or the display 3200. The memory controller 1200 may program a signal processed by the processor 3100 to the semiconductor memory device 1100. Furthermore, the radio transceiver 3300 may change a signal outputted from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be embodied in a pointing device such as a touch pad and a computer mouse, a keypad or a keyboard. The processor 3100 may control the operation of the display 3200 such that data outputted from the memory controller 1200, data outputted from the radio transceiver 3300, or data outputted form the input device 3400 is outputted through the display 3200.

In an embodiment, the memory controller 1200 capable of controlling the operation of the memory device 1100 may be embodied as a part of the processor 3100 or a chip provided separately from the processor 3100.

Figure 14:
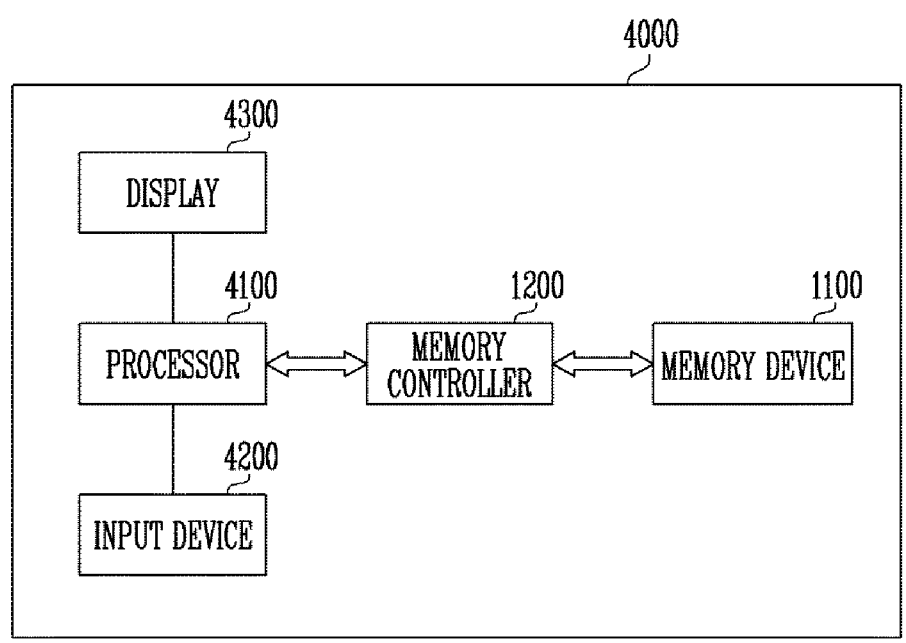
FIG. 14 is a diagram illustrating an example of a memory system including the memory controller shown in FIG. 3.

FIG. 14 is a diagram illustrating an example of a memory system including the memory controller shown in FIG. 3.

Referring to FIG. 14, a memory system 4000 may be embodied in a personal computer (PC), a tablet PC, a net-book, an e-reader, a personal digital assistant (PDA), a portable multimedia player (PMP), an MP3 player, or an MP4 player.

The memory system 4000 may include a memory device 1100, and a memory controller 1200 configured to control the data processing operation of the memory device 1100.

A processor 4100 may output data stored in the memory device 1100 through a display 4300, according to data input from an input device 4200. For example, the input device 4200 may be embodied in a pointing device such as a touch pad or a computer mouse, a keypad, or a keyboard.

The processor 4100 may control the overall operation of the memory system 4000 and control the operation of the memory controller 1200. In an embodiment, the memory controller 1200 capable of controlling the operation of the memory device 1100 may be embodied as a part of the processor 4100 or a chip provided separately from the processor 4100.

Figure 15:
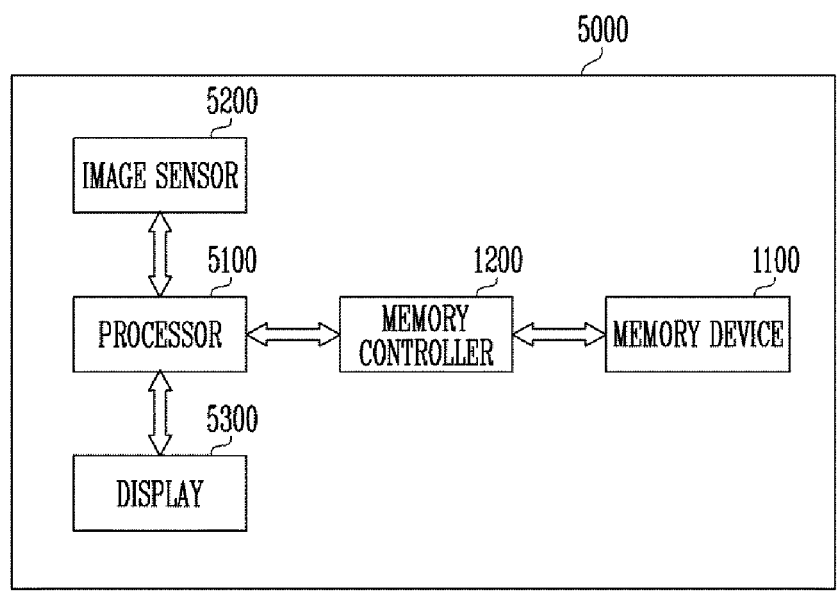
FIG. 15 is a diagram illustrating an example of a memory system including the memory controller shown in FIG. 3.

FIG. 15 is a diagram illustrating an example of a memory system including the memory controller shown in FIG. 3.

Referring to FIG. 15, a memory system 5000 may be embodied in an image processing device, e.g., a digital camera, a portable phone provided with a digital camera, a smartphone provided with a digital camera, or a tablet PC provided with a digital camera.

The memory system 5000 may include a memory device 1100, and a memory controller 1200 capable of controlling a data processing operation, e.g., a program operation, an erase operation, or a read operation, of the memory device 1100.

An image sensor 5200 of the memory system 5000 may convert an optical image into digital signals. The converted digital signals may be transmitted to a processor 5100 or the memory controller 1200. Under control of the processor 5100, the converted digital signals may be outputted through a display 5300 or stored in the memory device 1100 through the memory controller 1200. Data stored in the memory device 1100 may be outputted through the display 5300 under control of the processor 5100 or the memory controller 1200.

In an embodiment, the memory controller 1200 capable of controlling the operation of the memory device 1100 may be embodied as a part of the processor 5100 or a chip provided separately from the processor 5100.

Figure 16:
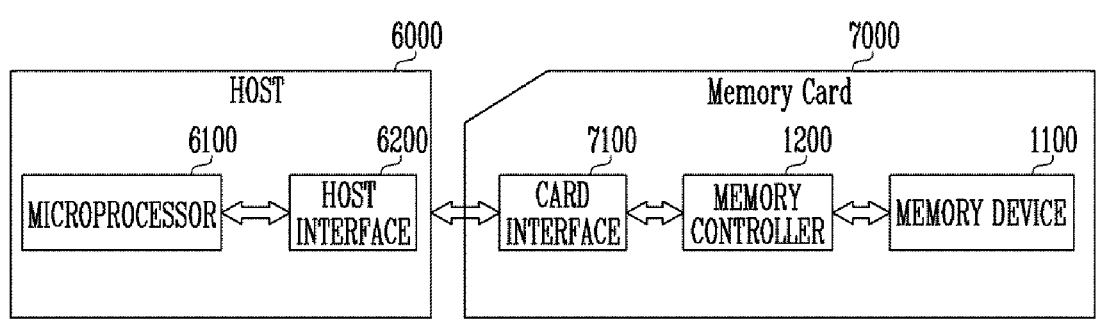
FIG. 16 is a diagram illustrating an example of a memory system including the memory controller shown in FIG. 3.

FIG. 16 is a diagram illustrating an example of a memory system including the memory controller shown in FIG. 3.

Referring to FIG. 16, a memory system 7000 may be embodied in a memory card or a smart card. The memory system 7000 may include a memory device 1100, a memory controller 1200, and a card interface 7100.

The memory controller 1200 may control data exchange between the memory device 1100 and the card interface 7100. In an embodiment, the card interface 7100 may be a secure digital (SD) card interface or a multi-media card (MMC) interface, but it is not limited thereto.

The card interface 7100 may interface data exchange between a host 6000 and the memory controller 1200 according to a protocol of the host 6000. In an embodiment, the card interface 7100 may support a universal serial bus (USB) protocol, and an interchip (IC)-USB protocol. Here, the card interface may refer to hardware capable of supporting a protocol which is used by the host 6000, software installed in the hardware, or a signal transmission scheme.

When the memory system 7000 is connected to a host interface 6200 of the host 6000 such as a PC, a tablet PC, a digital camera, a digital audio player, a cellular phone, console video game hardware or a digital set-top box, the host interface 6200 may perform data communication with the memory device 1100 through the card interface 7100 and the memory controller 1200 under control of a microprocessor 6100.

Figure 17:
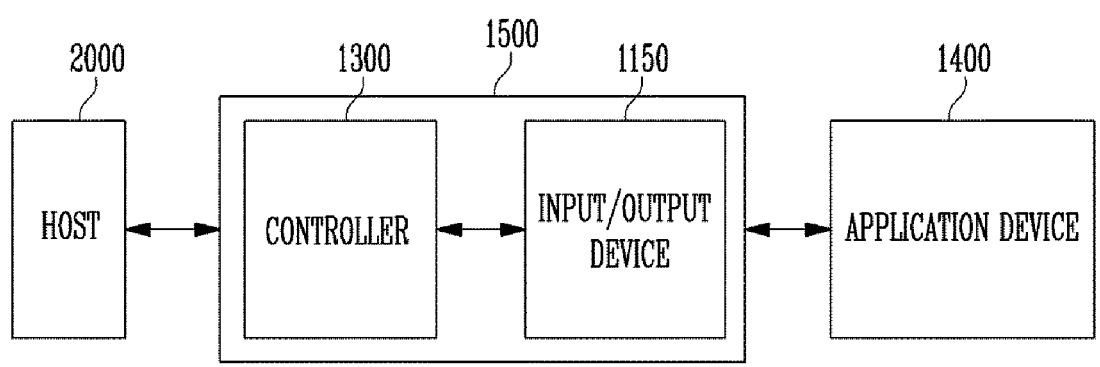
FIG. 17 is a diagram illustrating an interface system including a controller in accordance with an embodiment of the present disclosure.

FIG. 17 is a diagram illustrating an interface system 1500 including a controller in accordance with an embodiment of the present disclosure.

Referring to FIG. 17, the interface system 1500 may include an input/output device 1150 configured to communicate with an application device 1400, and a controller 1300 configured to control the input/output device 1150 under control of a host 2000.

The controller 1300 may control the overall operation of the interface system 1500 and data exchange between the host 2000 and the application device 1400. For example, the controller 1300 may control the input/output device 1150 in response to a request of the host 2000 to transmit data to the application device 1400 or receive data from the application device 1400.

In an embodiment, the application device 1400 may include a memory device. In an embodiment, the application device 1400 may include a non-memory device. For example, the application device 1400 may include a network device or a communication device. In addition, a device configured to perform various functions may be connected, as the application device 1400 of FIG. 17, to the interface system 1500.

Referring to FIGS. 1 to 4, there is illustrated an example where the memory controller 1200 includes the command queue 410, the command queue controller 430, and the command information storage 450. However, the controller according to the present disclosure is not limited to the memory controller 1200. For example, the controller 1300 according to the embodiment shown in FIG. 17 may control the operation of the application device 1400, which may have various forms, as well as the operation of the memory device. In this case, the application device 1400 may be operated based on commands transmitted form the controller 1300.

The controller 1300 of FIG. 17 may include the command queue 410, the command queue controller 430, and the command information storage 450 that are shown in FIG. 3. In this case, a command outputted from the command queue 410 may be transmitted to the application device 1400 through the input/output device 1150.

Various embodiments of the present disclosure provide a memory controller capable of more efficiently using a command queue.

Various embodiments of the present disclosure provide a method of operating the memory controller capable of more efficiently using the command queue.

Examples of embodiments have been disclosed herein, and although specific terms are employed, they are used and are to be interpreted in a generic and descriptive sense and not for purpose of limitation. In some instances, as would be apparent to one skilled in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A controller for controlling an operation of a semiconductor memory device, the controller comprising:

a command queue configured to store a plurality of commands;

a command information storage configured to store busy times corresponding to the plurality of commands, each of the busy times indicating a time in which each of the plurality of commands is performed; and a command queue controller configured to:

scan the plurality of commands stored in the command queue, and provide the plurality of scanned commands from the command queue to the semiconductor memory device, in order of a command with a shortest busy time from among the busy times being outputted first.

2. The controller according to claim 1, wherein the command queue controller is configured to:

apply a pop signal to the command queue to output a command among the plurality of commands, scan the command outputted from the command queue, and apply the scanned command and a push signal to the command queue so that the scanned command is inputted to the command queue.

3. The controller according to claim 1, wherein the command queue controller is configured to:

generate a check table to include the busy times corresponding to the plurality of scanned commands, and provide the plurality of scanned commands from the command queue to the semiconductor memory device, in order of the command with the shortest busy time among the busy times in the check table.

4. The controller according to claim 3, wherein the check table comprises addresses corresponding to the plurality of scanned commands, and wherein the command queue controller is configured to erase at least one command of commands having a same address among the plurality of scanned commands based on the addresses in the check table.

5. The controller according to claim 3, wherein the check table comprises addresses corresponding to the plurality of scanned commands, and wherein the command queue controller is configured to combine at least two commands having adjacent addresses among the plurality of scanned commands into one command based on the addresses in the check table.

6. The controller according to claim 3, wherein the check table further includes information indicating whether a sequence change is allowed.

7. The controller according to claim 3, wherein the check table further includes block address information, page address information, and plane information.

8. The controller according to claim 1, wherein the command queue controller further comprises a command storage configured to store at least one command.

9. The controller according to claim 8, wherein the command storage temporarily stores the at least one command.

10. The controller according to claim 8, wherein the command storage backs up the plurality of commands stored in the command queue.

11. A method of operating a controller configured to control an operation of a semiconductor memory device, the method comprising:

storing a plurality of commands in a command queue;

scanning the plurality of commands in order stored in the command queue; and providing the plurality of scanned commands from the command queue to the semiconductor memory device, in order of a command with a shortest busy time from among busy times of the plurality of scanned commands being outputted first, wherein each of the busy times is a time in which each of the plurality of scanned commands is performed.

12. The method according to claim 11, wherein the scanning comprises:
applying a pop signal to the command queue to output a command among the plurality of commands;
scanning the command outputted from the command queue; and
applying the scanned command and a push signal to the command queue to reinsert the scanned command into the command queue.

13. The method according to claim 12,
further comprising, after the applying of the scanned command and the push signal to the command queue,
applying, when a command which has not been scanned is present in the command queue, the pop signal to the command queue, and scanning a subsequently outputted command.

14. The method according to claim 11, the method further comprising:
generating a check table to include addresses corresponding to the plurality of scanned commands; and
erasing at least one command of commands having a same address among the plurality of scanned commands based on the addresses in the check table.

15. The method according to claim 14, wherein the erasing comprises:
applying a pop signal to the command queue for outputting a command among the plurality of commands;
scanning the command outputted from the command queue; and
determining whether a scanned command is a target command to be erased based on the addresses in the check table.

16. The method according to claim 15, wherein the erasing comprises, applying, when the scanned command is the target command to be erased, the pop signal to the command queue, and outputting a subsequent command from the command queue.

17. The method according to claim 15, wherein the erasing comprises, applying, when the scanned command is not the target command to be erased, the scanned command and a push signal to the command queue.

18. The method according to claim 11, further comprising changing a turn of at least one command among the plurality of commands.

19. The method according to claim 18, wherein the changing of the turn of the at least one command comprises:
applying a pop signal to the command queue for outputting a command among the plurality of commands;
scanning the command outputted from the command queue; and
determining whether a turn of a scanned command is transferred to a subsequent turn.

20. The method according to claim 19, further comprising temporarily storing the scanned command when the scanned command is a command to be transferred to the subsequent turn.

21. The method according to claim 20, further comprising applying the scanned command and a push signal to the command queue when the scanned command is not a command to be transferred to the subsequent turn.

22. A memory system comprising:
a semiconductor memory device comprising a plurality of memory cells for storing data; and
a memory controller configured to control an operation of the semiconductor memory device,
wherein the memory controller comprises:
a command queue configured to store a plurality of commands for controlling the operation of the semiconductor memory device;
a command information storage configured to store busy times corresponding to the plurality of commands stored in the command queue, each of the busy times indicating a time in which each of the plurality of commands is performed; and
a command queue controller configured to:
scan the plurality of commands in order stored in the command queue, and
provide the plurality of scanned commands from the command queue to the semiconductor memory device, in order of a command with a shortest busy time from among the busy times being outputted first.

* * * * *